United States Patent Office 2,722,534
Patented Nov. 1, 1955

2,722,534

ANTHRAQUINONE DYES FOR WOOL

David I. Randall, Easton, Pa., and Edgar E. Renfrew, Phillipsburg, N. J., assignors to General Aniline & Film Corporation, New York, N. Y., a corporation of Delaware No Drawing. Application December 20, 1950, Serial No. 201,867

2 Claims. (Cl. 260—372)

This invention relates to new and valuable dyestuffs of the anthraquinone series yielding blue shades upon dyeing wool.

We have discovered a new group of dyestuffs having the following general formula:

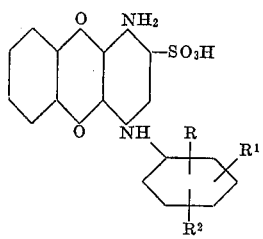

wherein R is selected from the group consisting of hydrogen, halogen (chlorine, bromine), hydroxy, lower alkyl (methyl, ethyl, propyl, butyl), lower alkoxy (methoxy, ethoxy, propoxy, butoxy), carboxylic and sulfonic acid groups; wherein $R^1$ is selected from the group consisting of hydrogen and the group $R^2$, and wherein $R^2$ has the formula:

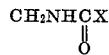

wherein X is the residue of an aliphatic dicarboxylic acid having one free carboxy group.

In general, these compounds are prepared by reacting 1-amino-4-bromo-anthaquinone-2-sulfonate, so called bromamine acid, with an aromatic amine having an acylated aminomethyl group. The amines are prepared by reduction and hydrolysis of the nitro compounds disclosed in U. S. patent application Serial No. 136,166 to Saul R. Buc, filed December 30, 1949, now Patent No. 2,652,403. These compounds have the formula:

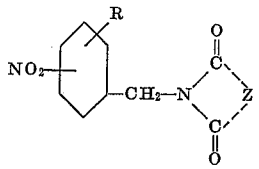

wherein R is hydrogen, halogen, hydroxy, lower alkyl, lower alkoxy, or carboxylic and sulfonic acid group; and wherein Z represents acyclic or alicyclic hydrocarbon radicals necessary to complete a cyclocarboimide ring, as for example:

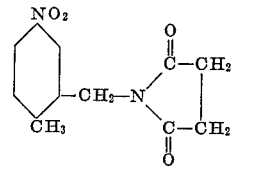

N-(2-methyl-5-nitrobenzl) succinimide

Upon reduction this is converted to the corresponding amino compound. Upon hydrolysis the ring is opened to form the corresponding acid which is reacted with the bromanine acid.

The following example discloses a preferred embodiment of the invention, but it will be understood that variations and modifications may be made within the scope of the claims.

Example

In a suitable vessel equipped with a stirrer was placed 21.8 parts by weight N-(5-amino-2-methylbenzyl)succinimide, 200.0 parts sodium hydroxide solution, 10% by weight. The mixture was heated until solution was achieved. It was cooled and sufficient dilute hydrochloric acid was added to cause complete precipitation; a large excess was avoided. The mixture was filtered and the cake was washed neutral. The cake was charged into a suitable vessel equipped with a stirrer, heater, thermometer and reflux condenser. Into this vessel was charged 24.3 parts sodium 1-amino-4-bromo-anthraquinone-2-sulfonate, 26.5 parts of sodium carbonate, 2.0 parts cuprous chloride and 600.0 parts water. The mixture was stirred at 80° C. for sixteen hours. Then was added slowly 200.0 parts sodium chloride solution (20%) and the mixture was allowed to cool to room temperature. The material which settled out was isolated by filtration. It may be further purified by the usual techniques (such as precipitation from aqueous basic solution by the addition of salt or precipitation from solution by the addition of acid). It may be converted to the ammonium salt for dyeing. The dyeings on wool were attractive greenish-blue shades and showed excellent properties, especially to light. The reaction may be represented as follows:

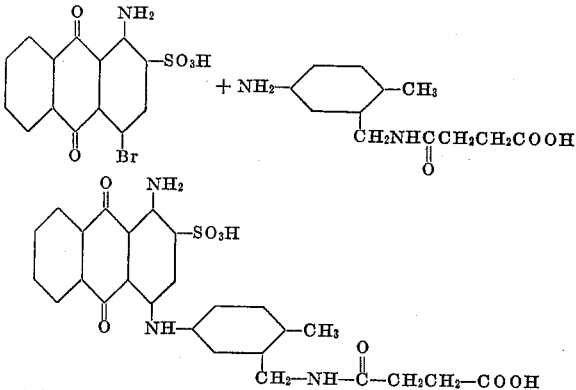

The present application is a continuation in part of our co-pending application Serial No. 132,397, filed December 10, 1949, now abandoned.

We claim:

1. New dyestuffs of the general formula:

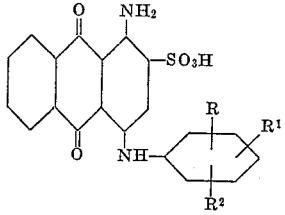

wherein R is selected from the group consisting of hydrogen, halogen, hydroxy, lower alkyl, lower alkoxy, carboxylic and sulfonic acid groups; wherein $R^1$ is selected from the group consisting of hydrogen and the group $R^2$; and wherein $R^2$ has the formula:

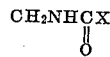

wherein X is the residue of an aliphatic dicarboxylic acid having one free carboxy group.

2. A new dyestuff of the formula:
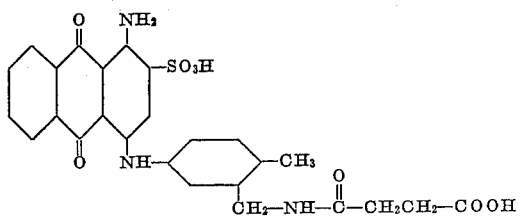
References Cited in the file of this patent
UNITED STATES PATENTS
1,946,829    Bayer _____ Feb. 13, 1934
2,245,780    Heinrich _____ June 17, 1941
2,533,178    Randall _____ Dec. 5, 1950